United States Patent [19]

Masuda et al.

[11] Patent Number: 5,289,219
[45] Date of Patent: Feb. 22, 1994

[54] CAMERA PROVIDED WITH RED-EYE PHENOMENON PREVENTING FEATURE

[75] Inventors: Hidetoshi Masuda; Toshio Nagata, both of Yokohama; Hidenori Taniguchi, Kawasaki, all of Japan

[73] Assignee: Canon Kabushiki Kaisha, Tokyo, Japan

[21] Appl. No.: 933,706

[22] Filed: Aug. 24, 1992

[30] Foreign Application Priority Data

Aug. 29, 1991 [JP] Japan .......................... 3-218658
Jan. 31, 1992 [JP] Japan .......................... 4-016579

[51] Int. Cl.$^5$ .......................................... G03B 15/03
[52] U.S. Cl. ........................... 354/149.11; 354/267.1
[58] Field of Search ............... 354/413, 414, 415, 419, 354/126, 149.1, 149.11, 266, 267.1

[56] References Cited

U.S. PATENT DOCUMENTS 4,978,989 12/1990 Nakano et al. ................. 354/149.11
4,999,663 3/1991 Nakamura ........................... 354/415

Primary Examiner—David M. Gray
Attorney, Agent, or Firm—Fitzpatrick, Cella, Harper & Scinto

[57] ABSTRACT

A camera provided with a red-eye phenomenon preventing feature, includes a control device for controlling the red-eye phenomenon preventing feature in response to at least one of a photometry result and a predetermined speed of a shutter release button operation.

24 Claims, 3 Drawing Sheets

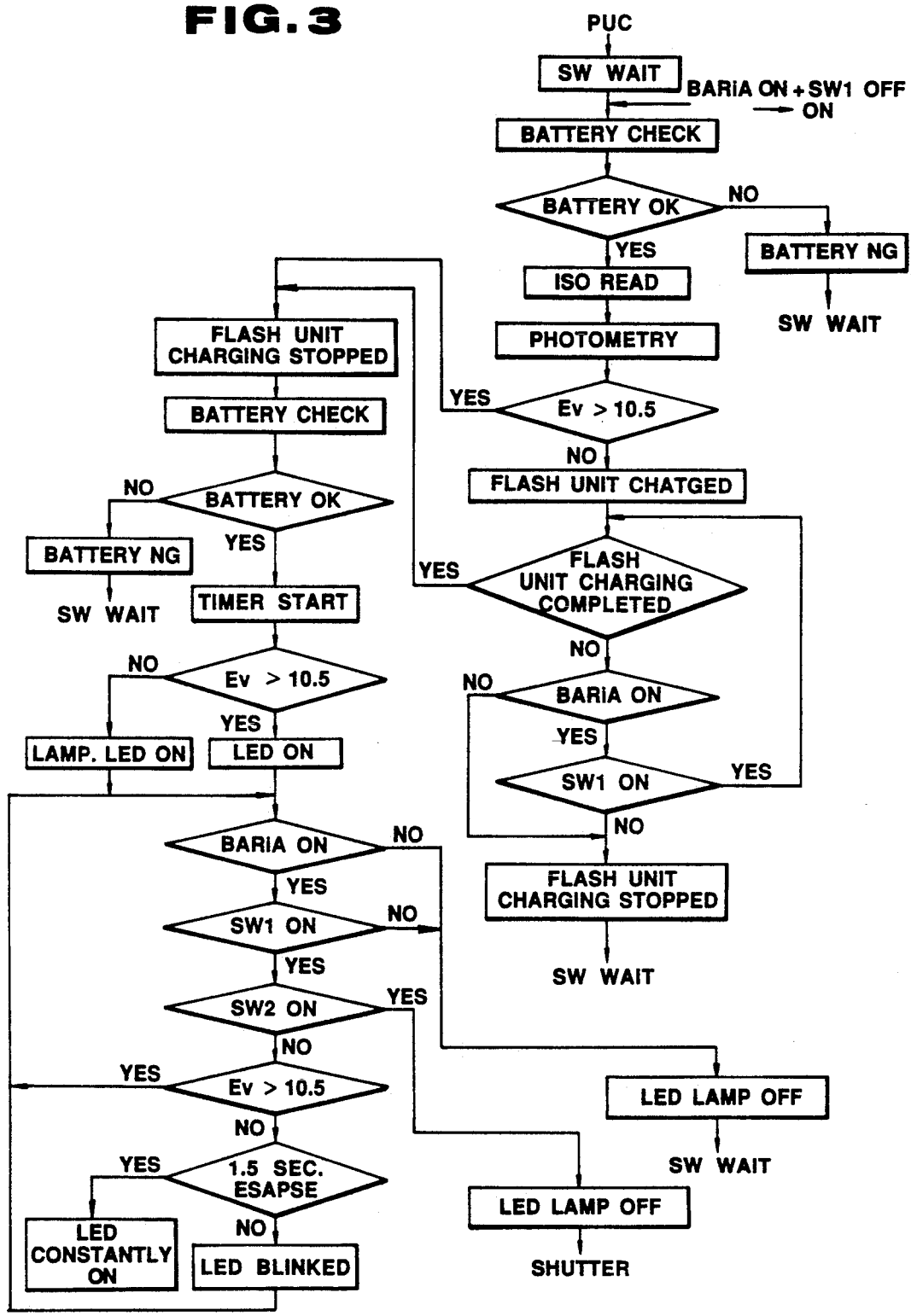

CAMERA PROVIDED WITH RED-EYE PHENOMENON PREVENTING FEATURE

BACKGROUND OF THE INVENTION

Field of the Invention

The present invention relates to a camera, and more particularly, to an improvement in a camera provided with a feature for preventing a red-eye phenomenon occurring in flash photography.

Description of the Related Art

Recently, a large number of cameras are provided with a feature for preventing the red-eye phenomenon that occurs when a person or an animal is photographed using a flash. When such flash photography is performed by using this kind of camera, in order to prevent the red-eye phenomenon, it is necessary to turn on a red-eye phenomenon preventing lamp and to wait for about 1.2 sec. before an exposure operation is started. Thus, during this waiting time, there is a possibility of missing a photographic opportunity.

In order to solve this kind of problem, a camera is proposed which has a switch for selecting whether to operate the red-eye phenomenon preventing feature.

A camera having a red-eye phenomenon preventing selecting operation switch such as above-described is advantageous with respect to being capable of selecting whether to operate the red-eye phenomenon preventing feature in accordance with user's own will, but the user must operate the red-eye phenomenon preventing selecting operation switch in addition to a shutter release button for every photograph. Consequently, its operation is less convenient, the operational time increases resulting in missing a photographic opportunity, and the cost is increased because of the addition of the switch.

SUMMARY OF THE INVENTION

One aspect of the present invention is to provide a camera having a red-eye phenomenon preventing feature, or an apparatus for such a camera, which comprises control means for controlling the red-eye phenomenon preventing feature in response to at least one of a photometry result or a predetermined speed of a shutter release button operation, whereby the operation of the camera is convenient, the photographic opportunity is not missed, and the cost is not increased.

Other aspects of the present invention will become apparent from the following description of the preferred embodiment of the present invention.

BRIEF DESCRIPTION OF THE DRAWINGS

FIG. 3 is a flowchart showing an operation of the circuit diagram shown in FIG. 2.

DETAILED DESCRIPTION OF THE PREFERRED EMBODIMENT

Preferred embodiments of the present invention will be described with reference to the accompanying drawings.

Figure 1:
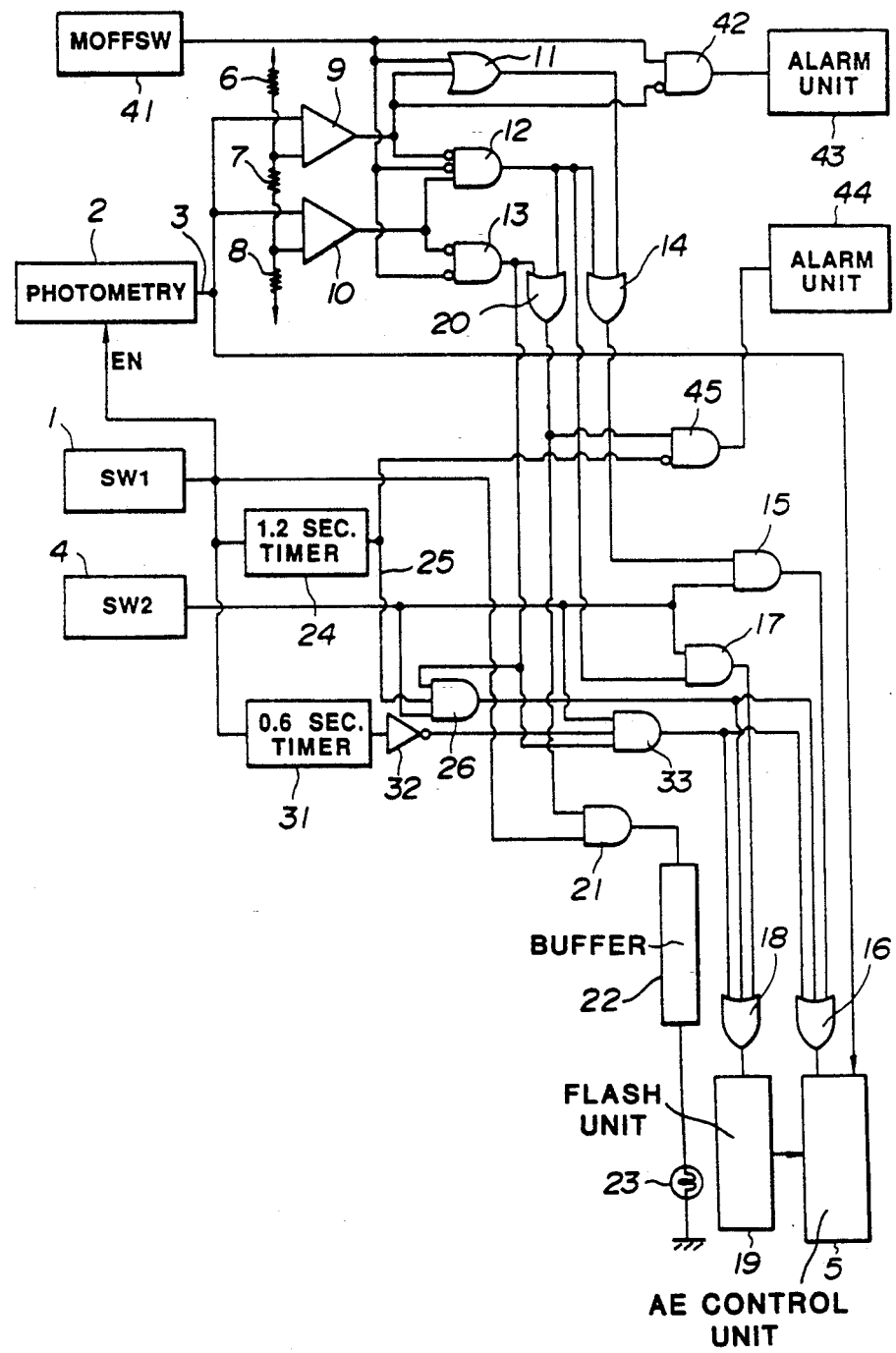
FIG. 1 is a circuit diagram of a camera in accordance with a first preferred embodiment of the present invention.

Referring to FIG. 1, reference numeral 1 denotes a preparatory switch (SW1) to be turned on in response to the first stroke of a shutter release button (not shown), and a photometry unit 2 is actuated to perform photometry in response to the preparatory switch 1 turning on. Reference numeral 3 denotes a output from the photometry unit 2; 4, a release switch (SW2) to be turned on in response to the second stroke of the shutter release button; 5, a well-known automatic exposure (AE) control unit; 19, a well-known flash unit; 23, a well-known red-eye phenomenon preventing lamp; 41, a flash light prohibition switch (MOFFSW) which is operated when the red-eye phenomenon preventing lamp 23 is prohibited from emitting light; 43 and 44, alarm units for providing alarm displays, 24, a 1.2 sec. timer; 31, a 0.6 sec. timer; 9 and 10, comparators for determining a level of the output 3 from the photometry unit 2 on the basis of three level grades.

The output 3 from the photometry unit 2 is voltage-divided with resistors 6, 7, and 8 and is compared with the three level grades formed by the comparators 9 and 10 to be determined. That is, when a subject brightness is high, the output of an OR gate 11 becomes "H", when the subject brightness is intermediate, the output of an AND gate 12 becomes "H" to emit flash light, when the subject brightness is low, the output of an AND gate 13 becomes "H" to turn on the red-eye phenomenon preventing lamp 23.

When the subject brightness is high or intermediate, since the red-eye phenomenon will not occur, a signal can be inputted to the AE control unit 5 through the OR gate 14, the AND gate 15, and the OR gate 16, and an automatic exposure (AE) operation is performed in response to turning on switch 4. In addition, when the subject brightness is intermediate, the outputs of AND gate 17 and OR gate 18 become "H" in response to turning on switch 4, to actuate the flash unit 19, and as a result, emitting flash light and the AE operation are performed at the same time.

Moreover, when the subject brightness is intermediate or low, the output of the OR gate 20 becomes "H", the output of the AND gate 21 becomes "H" in response to turning on switch 1, and the red-eye phenomenon preventing lamp 23 is turned on through a buffer 22. Therefore, even if the subject brightness is intermediate, if a user judges that the red-eye phenomenon may occur, the user can turn on the red-eye phenomenon preventing lamp 23 before an exposure operation by holding the shutter release button in the state of the first stroke.

When the subject brightness is low, in principle, it is necessary to prevent the red-eye phenomenon.

Therefore, the 1.2 sec. timer 24 is started in response to turning on the switch 1, the output 25 of the 1.2 sec. timer 24 becomes "H" after the red-eye phenomenon preventing lamp 23 is turned on for 1.2 sec., and then the flash unit 19 and the AE control unit 5 are actuated through the AND gate 26 and OR gates 16 and 18 in response to turning on switch 4. That is, after the red-eye phenomenon preventing lamp 23 is turned on for at least 1.2 sec., the exposure operation is started.

However, according to a photographic situation, there maybe a case where the user wants to begin the exposure operation immediately even if the red-eye phenomenon may occur. Accordingly, the present camera has a feature for meeting such a demand. That is, regarding photography at the time when the subject brightness is low, when it is determined that the shutter release button is pressed down in a fast speed (In the present embodiment, an interval between turning on switch 1 and turning on switch 2 is 0.6 sec. or less than 0.6 sec..), a different control operation from the above-described control operation is performed. When the subject brightness is low, and also the interval between turning on switch 1 and turning on switch 2 is 0.6 sec. or less than 0.6 sec., i.e. until switch 1 is turned on, the 0.6 sec. timer 31 acts and the timer 31 counts 0.6 sec. to turn the output of an inverter 32 into "L", the flash unit 19 and the AE control unit 5 can be actuated through the AND gate 33 and the OR gates 16 and 18 in response to turning on switch 2. Therefore, in this case, flash photography can be performed without waiting for the red-eye phenomenon preventing lamp 23 to turn on for 1.2 sec., differing from a normal flash photography with the red-eye phenomenon preventing lamp 23 turned on for 1.2 sec.

The camera of the present embodiment is further provided with the following feature.

When photography is performed at a dark time or place, there may be a case of not wanting to use flash light. What is provided in order to meet such a necessity is a flash light prohibition switch 41. When the flash light prohibition switch 41 is operated, the output from the OR gate 11 is turned into "H", and the AE control unit 5 is actuated through the OR gate 14, the AND gate 15 and the OR gate 16 in response to turning on switch 4, so that the AE operation is performed. At the same time, the outputs from the AND gates 12 and 13 are turned into "L", so that the flash unit 19 and the red-eye phenomenon preventing lamp 23 are both prohibited from emitting light.

In this case, the user need be warned because the exposure time becomes long. Accordingly, when the flash light prohibition switch 41 is turned on under the situation where the subject brightness is intermediate or low, the output from the AND gate 42 is turned into "H" so that a display unit 43 is actuated to warn of the low brightness.

On the other hand, a display for informing the user of the necessary time period that the red-eye phenomenon preventing lamp 23 takes to prevent the red-eye phenomenon from occurring, which is 1.2 sec. in the present embodiment, is also necessary. Accordingly, when the subject brightness is intermediate or low, the AND gate 45 is turned on during the aforementioned necessary time period, so that a display unit 44 is actuated to display a possibility of preventing the red-eye phenomenon or a state of preventing shutter release.

Next, a second preferred embodiment of the present invention w be described.

Figure 2:
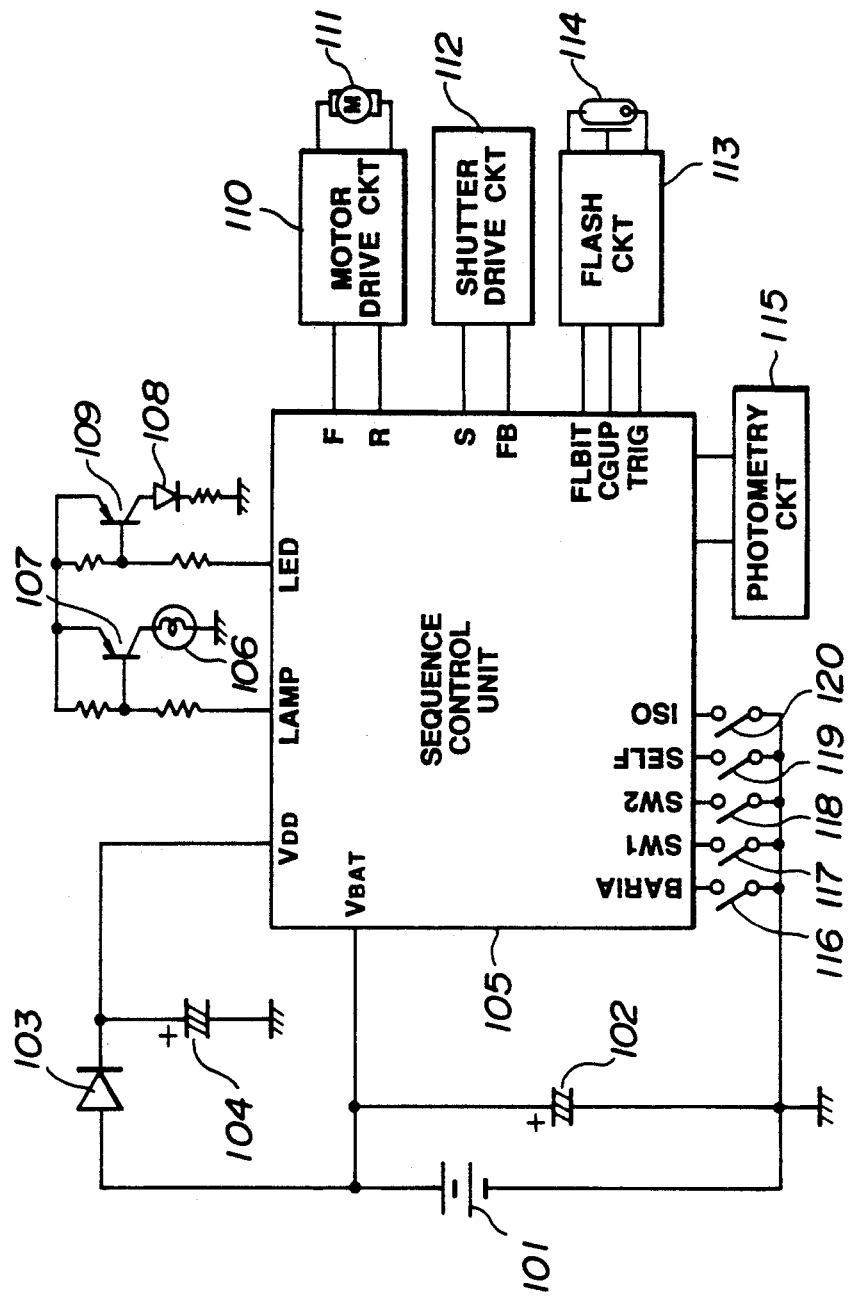
FIG. 2 is a circuit diagram of a camera in accordance with a sec. preferred embodiment of the present invention.

Referring to FIG. 2, reference numeral 101 denotes a battery as a power source; 102, a capacitor for smoothing the voltage of the battery 101; 103, a diode for rectifying the electric current from the battery 101 and for supplying the rectified electric current to a sequence control unit 105; 104, a capacitor for smoothing and backing up a power source VDD for the sequence control unit 105; 105, the sequence control unit for controlling a sequence of the camera; 106, a red-eye phenomenon preventing lamp for preventing the red-eye phenomenon that occurs at the time of flash photography; 107, a transistor for driving the red-eye phenomenon preventing lamp 106; 108, an LED for displaying a state of the camera; 109, a transistor for driving the LED 108; 110, a motor drive circuit for driving a film transporting motor 111; 111, the aforementioned film transporting motor; 112, a shutter drive circuit for driving a shutter; 113, a well-known flash circuit; 114, a xenon flash tube for the flash photography; 115, a photometry circuit for measuring a subject brightness; 116, a barrier switch for detecting whether a lens cover is opened; 117, a SW1 switch to be turned on in response to the first stroke of a shutter release button of the camera; 118, a SW2 switch to be turned on in response to the second stroke of the shutter release button of the camera; 119, a switch for performing self-timer photography; 120, a switch for detecting ISO film speed.

Next, the operation of the aforementioned camera will be described below in accordance with the flow-chart of FIG. 3 showing an operation of the sequence control unit 105.

When power from the battery 101 is supplied to the camera, the power source VDD is supplied to the sequence control unit 105 through the diode 103, a power-up-clear circuit is operated, and the sequence control unit 105 is actuated. At this time, a RAM in the sequence control unit 105 is initialized (not shown in FIG. 3), and then the program for detecting states of the switches 116 through 120 are operated.

Unless any states of the switches 116 through 120 are changed, the sequence control unit 105 continues checking the states of the switches 116 through 120. (In the discussion provided below, the state of this time is referred to as SW WAIT).

When a lens cover is opened so that the barrier switch 116 is turned on, and also the shutter release button is pressed down to the first stroke so that the SW1 switch 117 is turned on, the sequence control unit 105 goes out of the state of SW WAIT and performs a well-known battery-check operation. If the voltage of the battery 101 is low, the sequence control unit 105 determines that the battery 101 is not good, and discontinues the sequence operation to return to SW WAIT. If the voltage of the battery 101 is sufficiently high, the sequence control unit 105 reads a film speed from the switch 120, performs a photometry operation by means of the photometry circuit 115 and causes the flash circuit 113 to start to charge if the subject brightness is lower than a predetermined value (for example EV is 10.5). The sequence control unit 105 waits until the flash circuit 113 completes charging, detecting the states of the barrier switch 116 and SW1 switch 117. At this time, if at least one of the switch 116 and 117 is turned off, the sequence control unit 105 causes the flash circuit 113 to stop charging and returns to SW WAIT for checking the switches 116 through 120.

If the flash circuit 113 completes charging while the switches 116 and 117 remains on, the sequence control unit 105 causes the flash circuit 113 to stop charging immediately and performs the aforementioned battery-check operation again. If the battery-check operation determines that the battery voltage level is sufficient, the sequence control unit 105 starts a timer (not shown) in the sequence control unit 105.

At this time, since the flash photography will be performed if the result of the aforementioned photometry is darker than the predetermined value, the red-eye phenomenon preventing lamp 106 is turned on in order to prevent the red-eye phenomenon and the LED 108 is turned on in order to inform a user of completing a photographic preparation.

Afterward, the sequence control unit 105 determines a state of the timer, detecting the states of the switches 117 and 118. The LED 108 blinks for a predetermined time period (for example 1.5 sec.), whereby the user is warned that a red-eye phenomenon preventing effect by the lamp 106 emitting light is not sufficient, that is, the user is urged to hold the shutter release button at the position of the first stroke, not to press down the shutter release button to the second stroke.

If the timer counts the predetermined time period or more than the predetermined time period, the lamp 106 is changed over from a blinking state to a constantly lit state, and switches 116, 117 and 118 are being checked.

If at least one of the switches 116 and 117 is turned off, the sequence control unit 105 turns off the LED 108 and lamp 106 to return to SW WAIT in spite of the counting value of the timer.

If the shutter release button is pressed down while the switches 116 and 117 remains on, so that the SW2 switch 118 is turned on, the lamp 106 and the LED 108 are turned off in spite of the counting value of the timer, and the flash photography is performed (not shown in FIG. 3).

Afterward, the sequence controls unit 105 performs predetermined operations, such as a film wind operation (not shown in FIG. 3), and returns to SW WAIT.

The operation in the case where the subject brightness is sufficiently bright, will not described in detail because of being apparent from FIG. 3. That is, if the battery-check operation determines that the battery voltage level is sufficient, the LED 108 is turned on; and normal photography, wherein neither the red eye phenomenon preventing lamp 106 nor the flash circuit 113 is actuated, is performed in response to turning on the SW2 switch 118.

The individual components shown in outline or designated by blocks in the Drawings are all well-known in the flash camera arts and their specific construction and operation are not critical to the operation or best mode for carrying out the invention.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope cf the following claims is to be accorded the broadest interpretation so as to encompass all such modifications and equivalent structures and functions.

What is claimed is:

1. A camera provided with a red-eye phenomenon preventing feature, comprising:
   control means for controlling the red-eye phenomenon preventing feature in response to at least a speed of a shutter release button operation.

2. A camera according to claim 1 further comprising means for determining a photometry result, wherein said control means comprises means for giving a priority to an exposure operation over the red-eye phenomenon preventing feature in response to the photometry result being higher than a predetermined value.

3. A camera according to claim 1 further comprising means for determining a photometry result, wherein said control means comprises operation means for operating the red-eye phenomenon preventing feature in response to the photometry result being lower than a predetermined value.

4. A camera according to claim 3, wherein said operation means comprises means for emitting a red-eye phenomenon preventing light.

5. A camera according to claim 4, wherein said operation means comprises means for emitting the red-eye phenomenon preventing light for a predetermined time.

6. A camera according to claim 3, wherein said operation means comprises means for operating the red-eye phenomenon preventing feature for a predetermined time.

7. A camera according to claim 3, wherein said control means comprises exposure prohibition means for prohibiting an exposure operation in response to said operating means operating the red-eye phenomenon preventing feature.

8. A camera according to claim 7, wherein said control means comprises exception means for annulling said exposure prohibition means in response to the predetermined speed of the shutter release button.

9. A camera according to claim 7 wherein said control means comprises exception means for annulling said exposure prohibition means in response to the shutter release operational speed being faster than a predetermined value.

10. A camera according to claim 7 wherein said control means comprises exception means for annulling said exposure prohibition means in response to the photometry result being higher than a predetermined value.

11. A camera according to claim 7, wherein said control means comprises exception means for annulling said exposure prohibition means when a flash photography is not performed.

12. A camera according to claim 1 wherein said control means comprises means for displaying an operational state of the red-eye phenomenon preventing feature.

13. An apparatus for a camera with a red-eye phenomenon preventing feature, comprising:
   control means for controlling the red-eye phenomenon preventing feature in response to at least a speed of a shutter release button operation.

14. An apparatus for a camera according to claim 13 further comprising means for determining a photometry result, wherein said control means comprises means for giving a priority to an exposure operation over the red-eye phenomenon preventing feature in response to the photometry result being higher than a predetermined value.

15. An apparatus for a camera according to claim 13 further comprising means for determining a photometry result, wherein said control means comprises operation means for operating the red-eye phenomenon preventing feature in response to the photometry result being lower than a predetermined value.

16. An apparatus for a camera according to claim 15, wherein said operation means comprises means for emitting a red-eye phenomenon preventing light.

17. An apparatus for a camera according to claim 16, wherein said operation means comprises means for emitting the red-eye phenomenon preventing light for a predetermined time.

18. An apparatus for a camera according to claim 15, wherein said operation means comprises means for operating the red-eye phenomenon preventing feature for a predetermined time.

19. An apparatus for a camera according to claim 15, wherein said control means comprises exposure prohibition means for prohibiting an exposure operation in response to said operating means operating the red-eye phenomenon preventing feature.

20. An apparatus for a camera according to claim 19, wherein said control means comprises exception means for annulling said exposure prohibition means in response to the predetermined speed of the shutter release button.

21. An apparatus for a camera according to claim 19 wherein said control means comprises exception means for annulling said exposure prohibition means in response to the shutter release operational speed being faster than a predetermined value.

22. An apparatus for a camera according to claim 19, wherein said control means comprises exception means for annulling said exposure prohibition means in response to the photometry result being higher than a predetermined value.

23. An apparatus for a camera according to claim 19, wherein said control means comprises exception means for annulling said exposure prohibition means when a flash photography is not performed.

24. An apparatus for a camera according to claim 13, wherein said control means comprises means for displaying an operational state of the red-eye phenomenon preventing feature.

* * * * *

UNITED STATES PATENT AND TRADEMARK OFFICE
CERTIFICATE OF CORRECTION

PATENT NO. : 5,289,219
DATED : February 22, 1994
INVENTOR(S) : HIDETOSHI MASUDA, ET AL.

It is certified that error appears in the above-indentified patent and that said Letters Patent is hereby corrected as shown below:

IN FIG. 3-Sheet 3 of 3
    "CHATGED" should read --CHARGED--.

COLUMN 1
    Line 57, "sec." should read --second--.

COLUMN 2
    Line 4, "a" should read --an--; and
    Line 13, "displays," should read --displays;--.

COLUMN 3
    Line 51, "w be" should read --will be--; and
    Line 58, "source VDD" should read --source $V_{DD}$--.

COLUMN 4
    Line 16, "source VDD" should read --source Vdd--; and
    Line 46, "switch" should read --switches--.

COLUMN 5
    Line 15, "remains" should read --remain--;
    Line 20, "controls" should read --control--;
    Line 27, "on;" should read --on,--;
    Line 44, "cf" should read --of--;
    Line 53, "claim 1" should read --claim 1,--; and
    Line 60, "claim 1" should read -- claim 1,--.

UNITED STATES PATENT AND TRADEMARK OFFICE
CERTIFICATE OF CORRECTION

PATENT NO. : 5,289,219
DATED : February 22, 1994
INVENTOR(S) : HIDETOSHI MASUDA, ET AL.

It is certified that error appears in the above-indentified patent and that said Letters Patent is hereby corrected as shown below:

<u>COLUMN 6</u>
    Line 17, "claim 7" should read -- claim 7,--;
    Line 22, "claim 7" should read -- claim 7,--;
    Line 30, "claim 1" should read -- claim 1,--;
    Line 39, "claim 13" should read -- claim 13,--; and
    Line 46, "claim 13" should read -- claim 13,--.

<u>COLUMN 7</u>
    Line 6, "claim 19" should read --claim 19,--

Signed and Sealed this

Thirtieth Day of August, 1994

Attest:

BRUCE LEHMAN

Attesting Officer    Commissioner of Patents and Trademarks